US008661559B2

(12) United States Patent
Wilson et al.

(10) Patent No.: US 8,661,559 B2
(45) Date of Patent: Feb. 25, 2014

(54) SOFTWARE CONTROL FLOW WATERMARKING

(75) Inventors: Kelce Steven Wilson, Murphy, TX (US); Jason Dean Sattler, Beavercreek, OH (US)

(73) Assignee: Riverside Research Institute, New York, NY (US)

( * ) Notice: Subject to any disclaimer, the term of this patent is extended or adjusted under 35 U.S.C. 154(b) by 1130 days.

(21) Appl. No.: 12/482,552

(22) Filed: Jun. 11, 2009

(65) Prior Publication Data

US 2009/0288174 A1 Nov. 19, 2009

Related U.S. Application Data

(63) Continuation-in-part of application No. 10/920,672, filed on Aug. 18, 204, now abandoned.

(60) Provisional application No. 60/495,858, filed on Aug. 18, 2003.

(51) Int. Cl.
*H04L 9/32* (2006.01)
*H04N 7/16* (2011.01)
*G06F 7/04* (2006.01)
*G06F 17/30* (2006.01)

(52) U.S. Cl.
USPC .................................... 726/30; 713/176

(58) Field of Classification Search
None
See application file for complete search history.

(56) References Cited

U.S. PATENT DOCUMENTS

| 5,123,045 | A | 6/1992 | Ostrovsky et al. |
| 5,559,884 | A | 9/1996 | Davidson et al. |
| 5,588,137 | A | 12/1996 | Yoneda et al. |
| 5,745,569 | A | 4/1998 | Moskowitz et al. |
| 5,768,596 | A | 6/1998 | Chow et al. |
| 5,940,513 | A | 8/1999 | Aucsmith et al. |
| 6,006,328 | A | 12/1999 | Drake |
| 6,185,312 | B1 | 2/2001 | Nakamura et al. |
| 6,192,475 | B1 | 2/2001 | Wallace |

(Continued)

FOREIGN PATENT DOCUMENTS

| WO | 9964973 A1 | 12/1999 |
| WO | 0169355 A1 | 1/2001 |
| WO | 02101519 A3 | 12/2002 |
| WO | 03012603 A3 | 2/2003 |

OTHER PUBLICATIONS

Chow, Stanley, Gu, Y., Johnson, H., and Zakharov, V.A., "An Approach to the Obfuscation of Control-Flow of Sequential Computer Programs", Oct. 2001, pp. 1-15, Moscow State University, Moscow, Russia.

(Continued)

*Primary Examiner* — Azizul Choudhury
(74) *Attorney, Agent, or Firm* — Keith D. Nowak; Carter Ledyard & Milburn LLP

(57) ABSTRACT

The present invention is a system and method of software control flow watermarking including the steps of obtaining a program for protection, generating at least one watermark value using a formula or process from an external file, and placing the at least one watermark value in CASE values of the program. The system and method may further include determining the at least one watermark value by a formula with at least one variable. The formula may also contain a variable from outside of the program. The system may also stop the program if the variable from outside of the program is incorrect.

20 Claims, 11 Drawing Sheets

(56) References Cited

U.S. PATENT DOCUMENTS

| | | | |
|---|---|---|---|
| 6,367,012 B1 | 4/2002 | Atkinson et al. | |
| 6,591,415 B1 | 7/2003 | Torrubia-Saez | |
| 6,594,761 B1 | 7/2003 | Chow et al. | |
| 7,236,610 B1* | 6/2007 | Luo et al. | 382/100 |
| 2002/0066080 A1* | 5/2002 | O'Dowd | 717/128 |
| 2003/0023856 A1 | 1/2003 | Horne et al. | |
| 2003/0074516 A1 | 4/2003 | Cho et al. | |
| 2003/0217280 A1* | 11/2003 | Keaton et al. | 713/193 |

OTHER PUBLICATIONS

Myles, Ginger, Collberg, Christian, "Software Watermarking via Opaque Predicates: Implementation, Analysis, and Attacks", Power Point Presentation, Jun. 10-13, 2004, ICECR, U.S.

Madou, Matias, Anckaert, Bertrand, De Bosschere, Koen, "Code (De)Obfuscation", 2005, 4 pages, Ghent University, Ghent, Belgium.

Jones, Christopher, Mills, Robert, Raines, Richard, "Removing Security Through Obscurity from Software Watermarking", Fall 2006, pp. 14-17, vol. 9, No. 2, IANewsletter, Information Assurance Technology Analysis Center, U.S.

Madou, Matias, Anckaert, Bertrand, De Bus, Bruno, De Bosschere, Koen, Cappaert, Jan, Preneel, Bart, "On the Effectiveness of Source Code Transformations for Binary Obfuscation", 2006, 7 pages, Ghent University, Ghent, Belgium.

Madou, Matias, Van Put, Ludo, De Bosschere, Koen, "Understanding Obfuscated Code", 2006, pp. 1-4, 2006, ICPC, 14th IEEE International Conference, Athens, Greece.

* cited by examiner

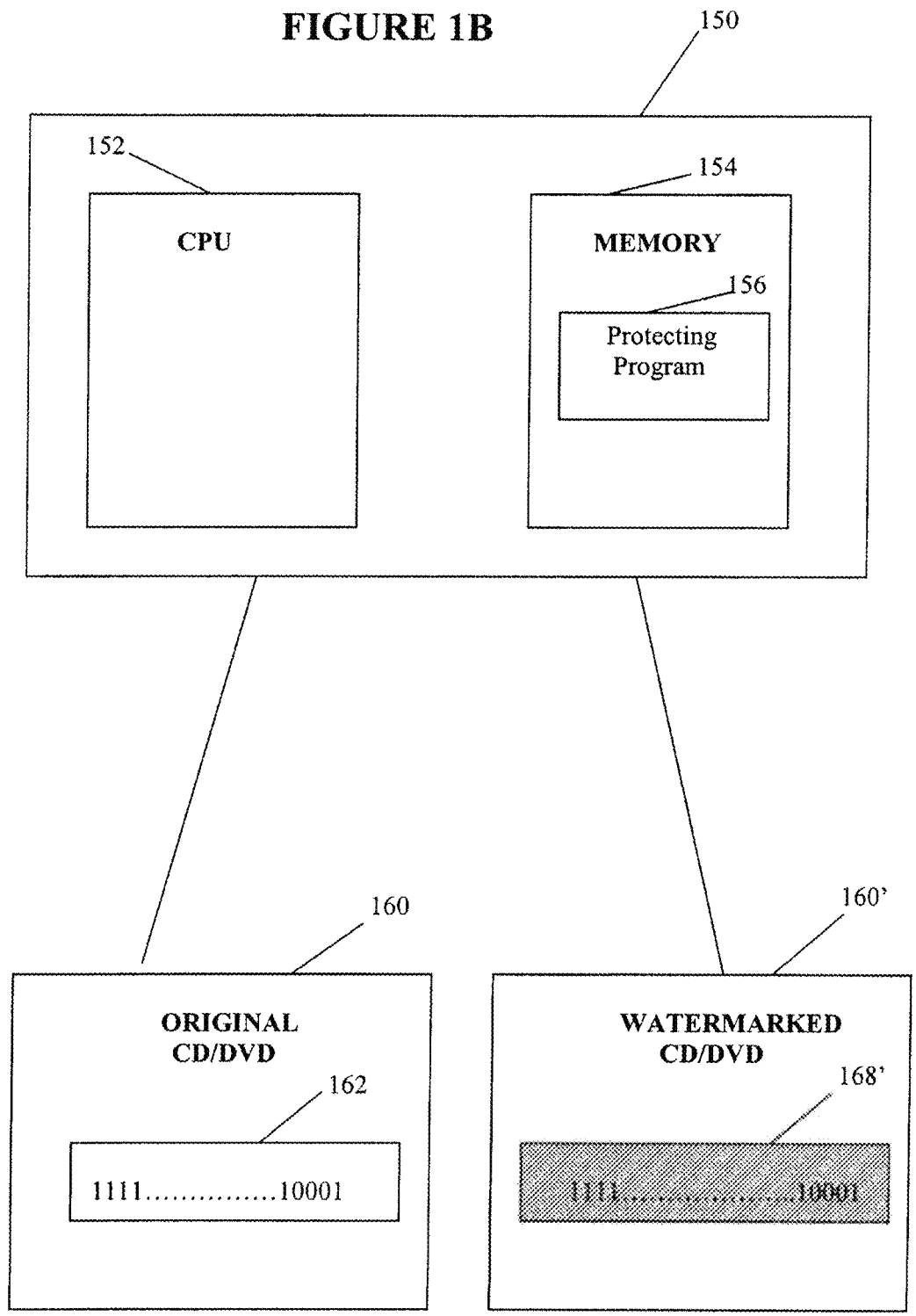

FIGURE 3A extern signed int __cdecl printf(const signed char* ,
             ...);
static signed char sv_StringValue[27] = {87, 97, 116, 101, 114, 109, 97, 114, 107, 105, 110, 103, 32, 116, 101, 115, 116, 32, 115, 116, 101, 112, 32, 35, 50, 10};

signed int main(void)
{
  signed int r_13945;
  signed int r_13968;
  signed int r_14041;
  signed int r_14050;
  unsigned char r_13935;
  r_13945 = 0;
  r_13968 = 2135361787;  ——— 310
  goto L_13949;
  L_13949:
  switch( r_13968 )
  {
    case 2135361786:
    goto L_65_new;
    case 2135361787:
    goto L_13952;
    case 2135361788:
    goto L_13955;
    case 2135361789:
    goto L_97_new;
    case 2135361790:
    goto L_13958;

FIGURE 3B goto L_13952;

L_13958:

return 0;

L_97_new:

printf((const signed char* )&sv_StringValue);

r_13968 = 2135361788;

goto L_13949;

L_13955:

r_13968 = 2135361790;

goto L_13949;

L_65_new:

r_14041 = 2135361788;

r_14050 = 2135361789;

r_13968 = (signed int)((signed char)r_13935)*r_14041+(signed
    int)((signed char)((signed char)r_13935^1))*r_14050;

goto L_13949;

L_13952:

r_13935 = 0;

r_13968 = 2135361786;

goto L_13949;

FIGURE 4A extern signed int __cdecl printf(const signed char* ,

...);

static signed char sv_StringValue[27] = {87, 97, 116, 101, 114, 109, 97, 114, 107, 105, 110, 103, 32, 116, 101, 115, 116, 32, 115, 116, 101, 112, 32, 35, 51, 10};

signed int main(void)

{ signed int r_13945;

signed int r_13968;

signed int r_14041;

signed int r_14050;

unsigned char r_13935;

r_13945 = 0;

r_13968 = 0X25778F89;  ——— 410 goto L_13949;

L_13949:

switch( r_13968 )

{ case 0X3F498006:  ——— 420 goto L_65_new;

case 0X25778F89:

goto L_13952;

case 0X6A2EF626:

goto L_13955;

case 0X252A7B1F:

FIGURE 4B

```
    goto L_97_new;

case OX1EBFF326:

goto L_13958;

;

}
goto L_13952;
L_13958:

return 0;

L_97_new:

printf((const signed char* )&sv_StringValue);

r_13968 = 0X6A2EF626;          ———  430 goto L_13949;

L_13955:

r_13968 = 0X1EBFF326;

goto L_13949;

L_65_new:

r_14041 = 0X6A2EF626;

r_14050 = 0X252A7B1F;

r_13968 = (signed int)((signed char)r_13935)*r_14041+(signed
        int)((signed char)((signed char)r_13935^1))*r_14050;

goto L_13949;
L_13952:
r_13935 = 0;
r_13968 = 0X3F498006;
goto L_13949;
```

FIGURE 5

FIGURE 6A extern signed int __cdecl printf(const signed char* ,

...);

static signed char sv_StringValue[27] = {87, 97, 116, 101, 114, 109, 97, 114, 107, 105, 110, 103, 32, 116, 101, 115, 116, 32, 115, 116, 101, 112, 32, 35, 51, 10};

```
signed int main(void)
{
  int a,b;
  signed int r_13945;
  signed int r_14041;
  signed int r_14050;
  unsigned char r_13935;
  r_13945 = 0;
  a = 0X14667E78;            ———— 605
  b = 0X11111111;            ———— 610
  goto L_13949;
  L_13949:
  switch( a+b )              ———— 615
  {
      case 1:

goto L_65_new;

case 0X25778F89:

goto L_13952;

case 0X6A2EF626:       ———— 630 goto L_13955;

case 0X252A7B1F:

goto L_97_new;

case 0X1EBFF326:

goto L_13958;
```

FIGURE 6B goto L_13952;

L_13958:

return 0;

L_97_new:

printf("Watermarking test step #4");  // Converted for Borland a = 0X3F498006;  ——— 620
b = 0X2AE57620;  ——— 625
goto L_13949;

L_13955:

a = 0X1EBFF326;
b = 0;
goto L_13949;

L_65_new:

r_14041 = 0X6A2EF626;

r_14050 = 0X252A7B1F;

a = (signed int)((signed char)r_13935)*r_14041+(signed int)((signed char
    )((signed char)r_13935^1))*r_14050;

b = 0;

goto L_13949;

L_13952:

r_13935 = 0;

a = 1;
b = 0;
goto L_13949;

SOFTWARE CONTROL FLOW WATERMARKING

PRIORITY AND RELATED APPLICATION

This application claims priority to U.S. patent application Ser. No. 10/920,672, filed Aug. 18, 2004, entitled "Software Control Flow Watermarking," which claims priority to U.S. Provisional Application Ser. No. 60/495,858, entitled "Software Control Flow Watermarking," filed on Aug. 18, 2003, the disclosures of both are hereby incorporated in their entirety by reference.

FIELD OF THE INVENTION

The present invention relates generally to embedding identifying information into a computer program, and more particularly relates to a method of providing software control flow watermarking.

BACKGROUND OF THE INVENTION

Software "piracy" is a significant problem for the computer software industry. As a result, in order to protect the integrity of the authorship and ownership of computer software, and reduce the occurrences of illicit copying, techniques have been developed to track software programs and to disable software that has been modified by an unauthorized user. Techniques for protecting authorship by embedding information into the source code are often referred to as "watermarking." Techniques to track unauthorized copying by embedding information into the source code are generally referred to as "fingerprinting."

One of the traditional difficulties in watermarking software is in making the watermark an integral part of the program in such a way that it cannot be readily detected and removed. One existing solution to this is to insert identifying marks so thoroughly into the software development plan that tampering efforts are likely to destroy the logic and the reliability of the software itself before the embedded information is fully removed. A problem with this approach is that the watermarking adds to development complexity and could limit the programming style of the individual programmers. Additionally, tying the logic of the program to uniquely identifiable features may introduce errors or "bugs" in the software under development, and changing the watermark to allow fingerprinting can be tedious and prohibitive.

Another solution is to insert additional variables or logic into the program after the primary logic has been validated. However, in this case, the likelihood that removing the watermark may still allow the program to function properly increases. Furthermore, the compiler, which converts the source code to object code, may alter the structure of the program, thus removing or altering all or part of the intended watermark.

For instance, WO 99/64973 entitled Software Watermarking Techniques, having Collberg as an inventor, teaches opaque predicates which are dynamic watermarking techniques. However, Collberg specifically avoids putting the watermark value in the CASE variables. Collberg's watermarks are inserted in the program data that appears in the registers and not in the set of decisions that influence which operations are executed such as execution control, logic control or program control flow. Accordingly, the watermarks of Collberg can be inserted or removed without affecting execution of the program.

Cloakware Corporation, of Ottawa, Canada has an approach to watermarking that uses what is referred to as branch flattening technology. In this approach, hierarchical program execution is transformed into a minimum number of SWITCH statements and new CASE variables are introduced. The portion of the program executed by each CASE option updates the CASE variable and sends the execution point back through a SWITCH statement via a GOTO point placed just prior to a SWITCH. In the Cloakware approach, CASE values are automatically generated by their TransCoder software, and appear to be a series of sequential numbers with an arbitrary initial seed value.

FIGS. 3A and B shows software code of the Cloakware TransCoder using sequential case labels. See below for example, the first case label is 2135361786 is followed by 2135361787 and so on. The TransCoder program logic flow is controlled by a SWITCH statement. The CASE statement in this embodiment is:

```
switch(r__13968)
{
    case 2135361786:
        goto L__65__new;
    case 2135361787:
        goto L__13952;
    case 2135361788:
        goto L__13955;
    case 2135361789:
        goto L__97__new;
    case 2135361790:
        goto L__13958;
    ;
}
```

An exemplary CASE variable is r__13968. An exemplary CASE value assigned to a CASE variable is case 2135361786.

While this approach is effective, since the CASE values take the form of a predictable sequence of numbers (i.e., sequential), a person interested in disabling this form of watermark can remove it by searching the code for the sequential CASE values.

Thus, a problem remains in the art to reliably and effectively insert a watermark or fingerprint into a computer program in a manner that is relatively simple for the designer to implement yet still provides a significant deterrent to potential copiers.

SUMMARY OF THE INVENTION

One object of the present invention is to provide a system and method of watermarking computer software in a manner that is easy for the developer to insert, yet difficult for an attacker to remove.

It is another object of the present invention to provide watermarking software wherein the watermarking scheme and watermark values are publishable to software developers without the risk of compromising the integrity of the resulting watermark values.

It is another object of the present invention to increase tamper resistance in software.

It is another object of the present invention to provide dynamic watermarking technique that is integral to execution.

It is another object of the present invention to provide dynamic watermarking technique that is will specifically interfere with execution flow when perturbed.

It is another object of the present invention to insert watermarks in CASE labels.

It is another object of the present invention to insert watermarks into the execution control rather than program data.

In a first embodiment of the present invention, a method of software watermarking is provided which includes obtaining a program for protection, generating at least one watermark value using a formula or process, placing the at least one watermark value in a CASE variable, or in a formula to calculate the watermark value, and assigning corresponding watermark values to the variable used in the SWITCH statement or the variables used to calculate the CASE value. The values themselves are not created by a sequential counting algorithm as in the prior art, but instead are read in from a file containing results of a formula or process.

In an alternate embodiment, an extension may be added which uses a formula within the SWITCH statement to replace the CASE variable. A further extension may be added which uses an external value such as a password, dongle, biometric data, or internet data in the formula.

BRIEF DESCRIPTION OF THE DRAWINGS

FIG. 1B is a block diagram illustrating the method shown in FIG. 1A.

FIGS. 3A and 3B are software code of a prior art TransCoder program without watermarking as described in the present invention.

FIGS. 4A and 4B are a listing of an exemplary embodiment of software code after placing the at least one watermark value in the at least one CASE value, in accordance with the present invention.

FIG. 5 is a display of a binary file of software processed in accordance with the present watermarking methods showing inserted watermark values after compilation.

FIGS. 6A and 6B are a partial listing of computer software showing an alternate embodiment of the software code of the present invention.

DETAILED DESCRIPTION OF THE PREFERRED EMBODIMENT OF THE INVENTION

In the present invention, rather than rely on a detectable series of sequential numbers as watermark values, at least a portion of watermark values are the result of a process or function, such as a hash function or an encrypted data stream. This approach can be used to provide a watermark for the software, so long as the watermark values that result from the selected function are not likely to be otherwise valid values of the CASE statement during program execution. That is, if a specific potential watermark value might be a legitimate data value in the program or an already existing CASE variable, then that value, and therefore that function, cannot be used. Thus, the primary constraints on the allowable watermark values are that the watermark value should not duplicate other values in the logic flow and that the watermark value does not cause compilation or runtime problems with the compiler.

Figure 1A:
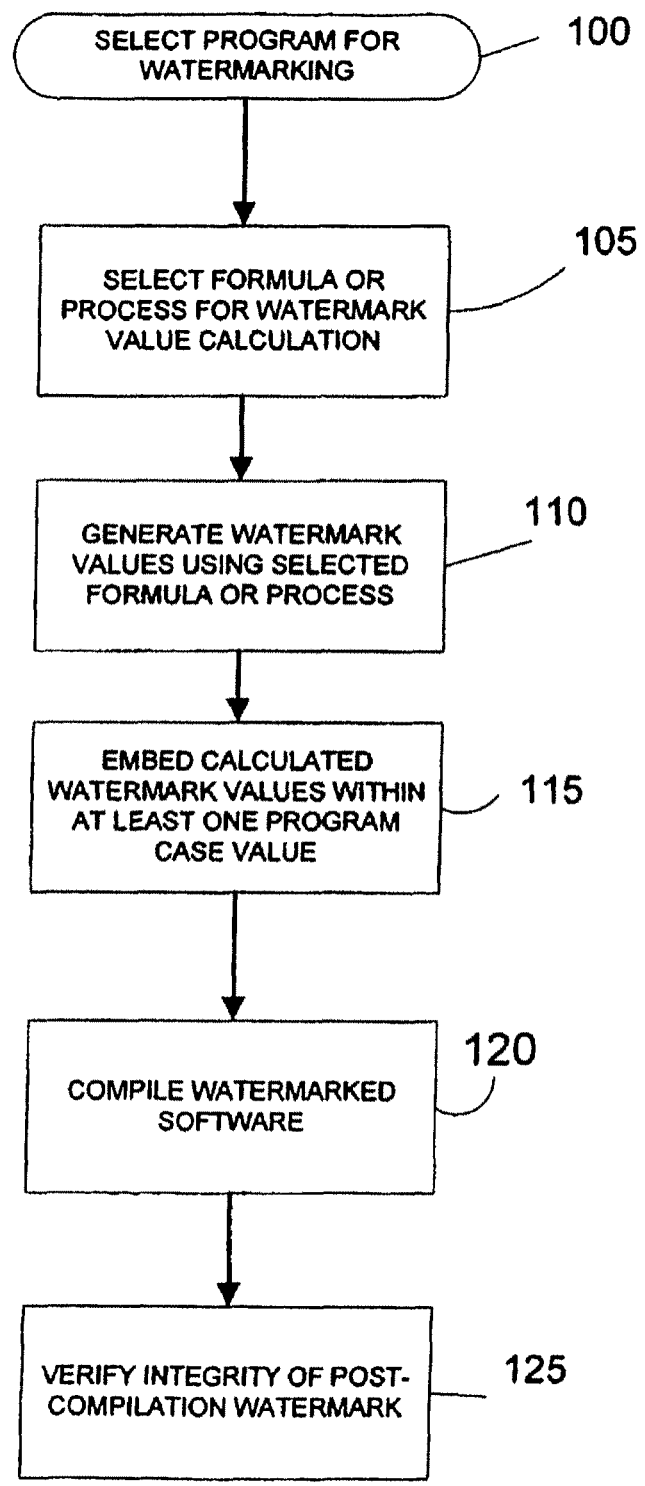
FIG. 1A is a flow chart illustrating a method of watermarking software in accordance with the present invention.

Referring to FIG. 1A, a first method in accordance with the present invention is illustrated. In this method, a program or software module to be protected by the present invention is selected (step 100). A formula or process that will be used to generate watermark values is also selected (step 105). The formula or process of step 105 is selected such that the resulting watermark values will not be readily determined or detected in the final software. The formula or process selected in step 105 is further selected to generate watermark values which are not likely to be used in the normal course of runtime operation in the software. This minimizes the likelihood that the watermark values will effect the actual software operation. In one embodiment, the Secure Hash Standard 1 (SHA-1) can be applied to a pre-selected alphanumeric string in order to generate the watermark values.

The selected formula or process in step 105 is then used to generate at least one watermark value (step 110), as will be discussed infra in FIG. 2 below. For example, if SHA-1 is applied to the arbitrary phrase: "Watermarking test #1 for Cloakware's TransCoder," the resulting watermark values in step 110 are: 3F498006, 25778F89, 6A2EF626, 252A7B1F, 1EBFF326, see display field 215. It will be appreciated that for the formula or process of step 105, many other hash values, encrypted data stream, or any other hex result chosen by the watermarking party may be used.

The watermark values generated in step 110 are then embedded in the software to be protected by placing the watermark value in at least one CASE statement as a CASE value (step 115). Since the formula of step 105 was selected to generate watermark values which are not likely to be encountered during execution of the program, the insertion of the watermark as a CASE value is unlikely to adversely effect program execution. After the watermark values are embedded, the program is compiled to generate an executable file (step 120). The integrity of the watermarking process can be verified by evaluating the compiled Hex file to identify the presence of the watermark value (step 125).

FIG. 1B shows a block diagram outlining the present invention and should be interpreted with FIG. 1A. In step 100, the program to be protected is original software code 162 of a CD/DVD 160. This original software 162 has SWITCH statement and CASE variables. In step 105, the formula/process used to generate the watermark values, is protecting program 156. The protecting program 156 is disposed in a computer or other computing apparatus 150 which is shown with a CPU 152 and computer RAM 154. Specifically, it is the RAM 154 of the apparatus 150 that possesses the protecting program 156. The protecting program 156 takes the unprotected-original computer code 162, integrates the watermarks within the logic of the computer code 162 for instance the watermark values are set in the CASE labels.

As the watermark is integrated within the logic, the removal of these watermarks will damage functionality. The CASE variables and the CASE labels represent integral logic components as they replace what was in the original control flow. The watermarks therefore are inherently tamper-resistant by nature of the watermark being integrated within the program execution.

In instances where the SWITCH statement and CASE variables are missing or not present, some embodiments of a protecting program 156 may add them to the software code 162 before embedding the watermark. The protecting program 156 adds the formula into the SWITCH statement of the software code 162, the watermark values into CASE labels and the formula input value assignments into the CASE block sections such that the watermark values can be calculated during execution, see step 130. It will be appreciated that the computer code 162, 162' is shown as a binary representation and that alternative representations may be used such as hexadecimal and ASCII representations of programs and other memory content, see FIG. 5. Also, it should be noted that the CD/DVD 160 is one non-limiting type of computer readable medium. Other types of computer readable medium include and are not limited to magnetic media, magnetic storage device (disk drive, removable media, floppy disks, etc.), other optical media, electronic memory circuits, volatile RAM, non-volatile RAM and the like. Similarly, the computer RAM 154 is one non-limiting example of memory and may include CD/DVD, magnetic media, other optical media, volatile RAM, non-volatile RAM and the like. The RAM 154 may even be on a remote computing node within the computing apparatus, or connected to the computing node.

Figure 2:
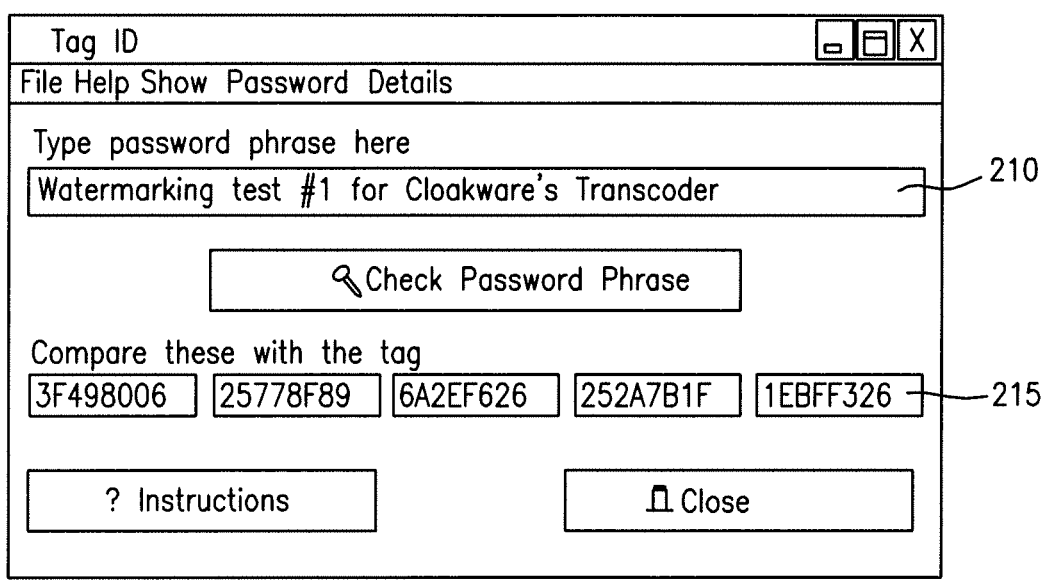
FIG. 2 is a screen shot view of an exemplary embodiment of a graphical user interface used in the present invention for generating at least one watermark value.

FIG. 2 shows an embodiment of a graphical user interface used in the method for generating at least one watermark value. The watermark values used in this example are the Secure Hash Standard 1 (SHA-1) values of the phrase: "Watermarking test #1 for Cloakware's Transcoder," which is entered in data entry field 210. Of course, it will be appreciated that this is an arbitrary text string selected by the watermarking party. In the example where SHA-1 is used to generate watermark values from this string, the resulting watermark values in step 110 are: 3F498006, 25778F89, 6A2EF626, 252A7B1F, 1EBFF326, as shown in display field 215.

FIGS. 3A and 3B illustrates a sample source code listing prior to watermarking.

FIGS. 4A and 4B shows software code after placing the at least one watermark value in the at least one CASE value. The watermark values are apparent by comparing, for example assignment 310, r__13968=2135361787 in the unwatermarked code with assignment 410, r__13968=OX25778F89 in the watermarked code, see FIG. 4A. The 25778F89 watermark value is seen in the second window of display field 215, see FIG. 2.

The TransCoder CASE values of FIGS. 3A and 3B are substituted with watermark values in accordance with the present invention in FIGS. 4A and 4B. This is done in this embodiment by post-processing, but may be included as part of the TransCoder process or any other compiler's pre-processing step. In one embodiment, only a portion of the code can be replaced with the watermark value.

Looking at FIG. 4A, the CASE variable of the SWITCH statement is initially assigned to number 0X25778F89, see 410 the CASE variable of the SWITCH statement, switch(r__13968) is the compared to each CASE value in the CASE statement until the first equality is found. Notice each of the CASE values in the CASE statement have been replaced with watermark values from display field 215 in FIG. 2. (Compare FIG. 4A with FIG. 3A). The CASE variable of 0X25778F89 does not equal (or is not a duplicate of) the first CASE value of case 0X3F498006 and does not execute the CASE block associated therewith. The CASE variable of 0X25778F89 is then compared to the next CASE value of case 0X25778F89. Here a match is made and the associated CASE block, goto L__13952, is executed. The CASE block provides the next value for the CASE variable as r__13968=0X3F498006, see bottom of FIG. 4B and is directed back to the beginning of the program by goto L__13949 to once again enter the CASE statement using the newly obtained CASE variable of 0X3F498006. The CASE statement comprises the SWITCH statement and the CASE labels and is interweaved with a series of CASE blocks. The code sections within the CASE blocks are not considered part of the CASE statement.

It should be noted that the prior art does not use random case value numbers as computation become exceptionally burdensome due to the added task of having to detect potential duplicate CASE values in each previously created CASE label. Embodiments of the present invention builds on the generation system of the prior art and replaces a portion of the sequential CASE labels with the generated watermark values. Thus, no huge computational burden placed on the program as all that is needed to be done is to compare each of the generated watermark values to ensure there are no duplication. The prior art does not arrive at the present invention due to the previously deemed daunting and overly burdensome task of ensuring that there were no duplicates in each of the hundreds of thousand CASE labels in a program. Thus, the prior art never viewed CASE label as an opportunity for watermarks.

Figure 5:
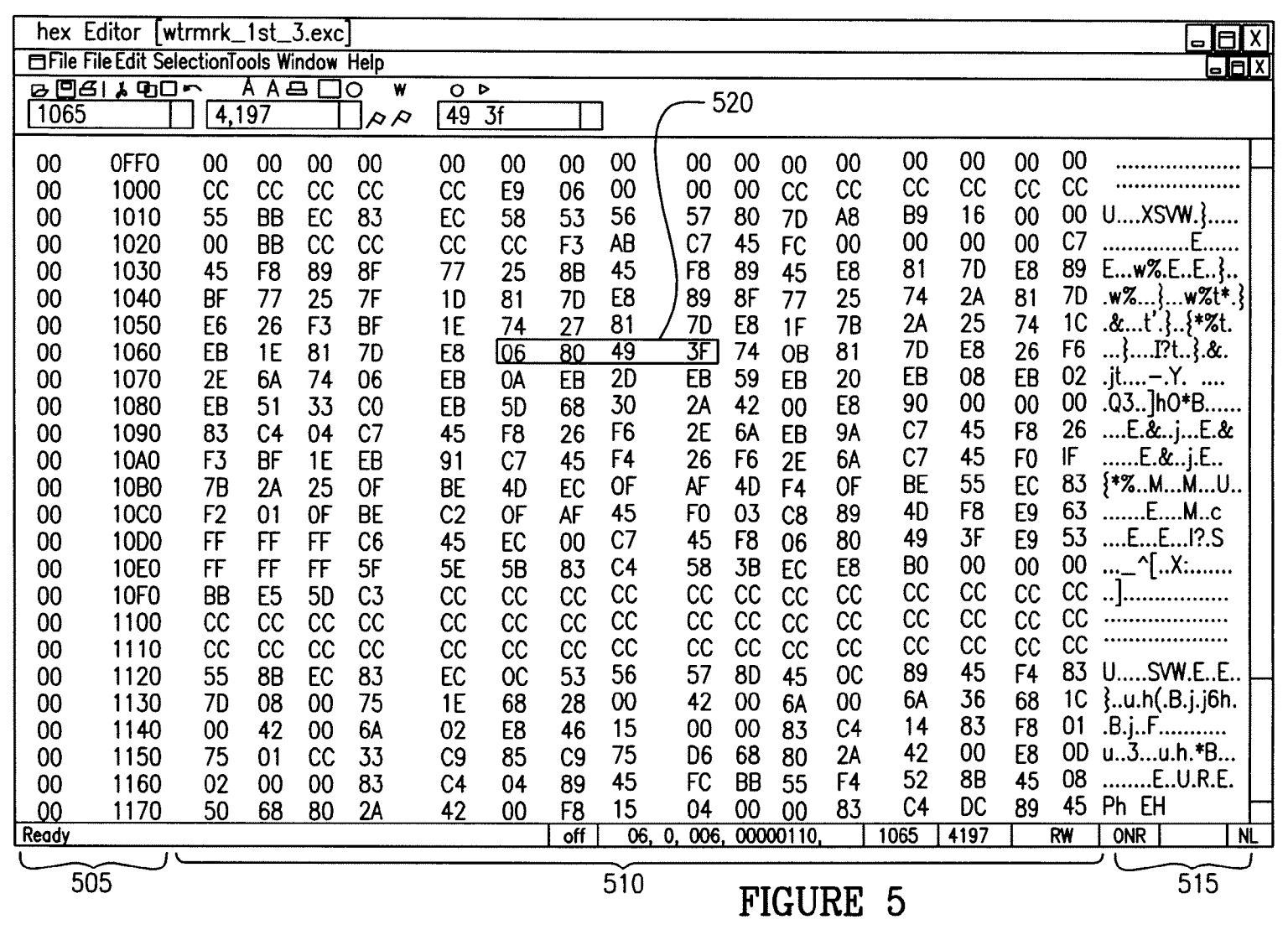

The software developer may then ensure that the watermark exists in a binary executable file (step 125). The contents of the RAM of FIG. 5 shows 19 columns. The first and second columns are memory addresses 505, the third to eighteenth columns are Hex code 510 and the nineteenth column is ASCII 515. A binary file editor can be used to verify the presence of the static watermark values in the program after compilation. Because of the complexity of compilers, not all watermark values may be present in the compiled code, but if enough values are seeded into the source code, a probability can be established that the software is effectually watermarked. Depending on the computer for which the program was compiled, the watermark values may be in reverse-byte order as shown in FIG. 5. Compare 520 in FIG. 5 which highlights "06 80 49 3F" to 420 in FIG. 4A which reads "case OX3F498006:", 520 is reverse order of 420.

FIGS. 6A and 6B shows a listing of software code for an alternate embodiment of the present invention. In this alternate embodiment, a SWITCH statement evaluates a formula, such as in the form "a+b" 615, where the variables "a" and "b" of the formula are assigned in a function prior to returning program control to the switch block.

Figure 7:
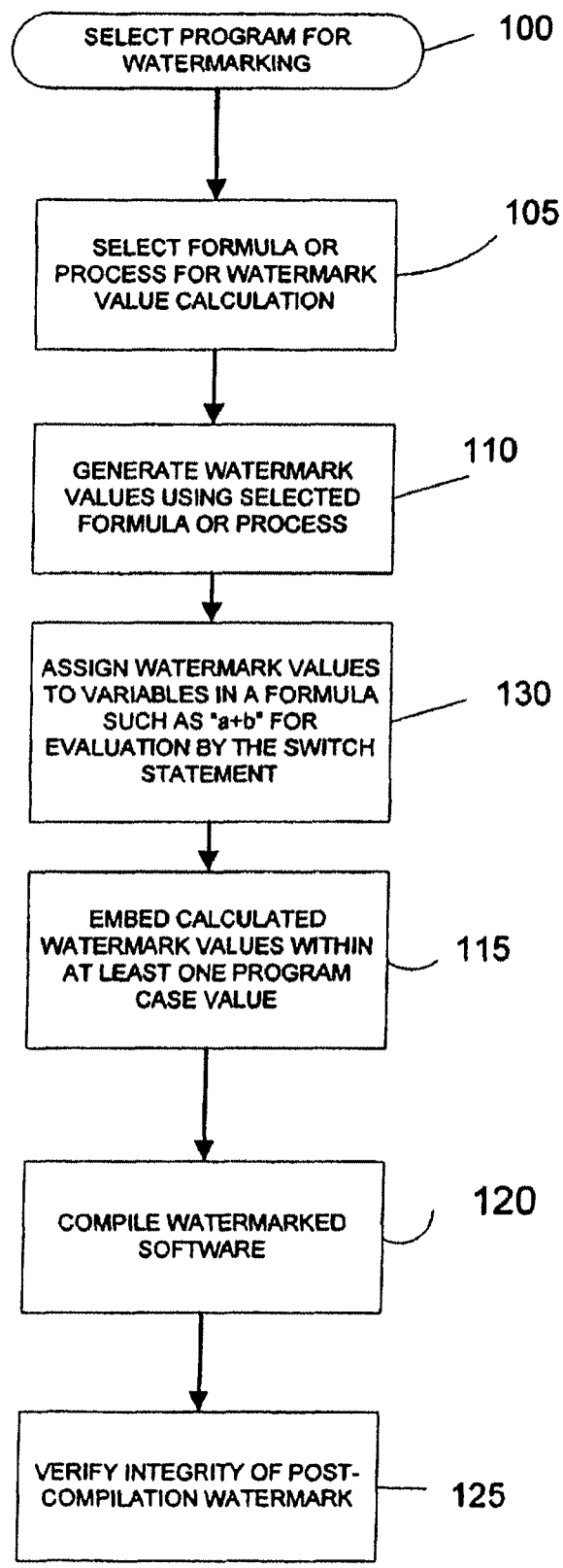
FIG. 7 is a flow chart illustrating an alternate embodiment of the present invention.

The flowchart of FIG. 7 illustrates an alternate embodiment of the present invention. In this alternate embodiment, a SWITCH statement evaluates a formula, such as in the form "a+b", where the variables "a" and "b" of the formula are assigned in a function prior to returning program control to the switch block. In this embodiment, after the watermark values are generated, they are inserted into a formula such as "a+b" for evaluation by the SWITCH statement (step 130). The formula calculates a watermark for insertion into at least one CASE value (step 115).

An advantage to using a function for evaluating the SWITCH statement is that the formula can calculate the watermark value immediately prior to use. As a result, the watermark values do not appear in a static form in the executable code in more than one location. In an alternate embodiment, the formula used to generate the watermark values can use other watermark values as the variables "a" and "b" to further reduce the likelihood that tampering will eliminate all embedded watermark values. The watermark values generated in this case are only visible during a dynamic analysis of the software.

The present invention discloses a self-testing integrated mixture of static and dynamic watermarks that are identical. By using a CASE statement, a situation is created in which the static watermarks (CASE labels) are compared for equality with the dynamically-generated watermarks (those calculated by a function). It is when there is equality, the static CASE labels and dynamic CASE variable watermarks are identical or equal, that the program will function correctly and the execution goes into the CASE block. This self-testing property makes the watermark so tightly integrated with the protected software or computer code 162' that it need not be tested for using specialized inputs and a separate testing function. Simply having the computer code 162' executing properly is a testament to the strong likelihood that the watermark is intact.

Referring to FIGS. 6A and 6B, each CASE label is replaced with a watermark value such as the ones shown in FIG. 2. These watermark values can be generated using any method. Then the values for variables "a" and "b" are calculated and put into each case block. For instance, the variables "a" and "b" 605 and 610, respectively, have been inserted with an exemplary formula of "a+b" 615 within the SWITCH statement, replacing the variable r__13968 (410 in FIG. 4A) with a watermark value. This formula can be simpler than the formula or process such as SHA-1. Note that the previous assignment of the CASE variable r__13968 to 0X6A2EF626 (430 illustrated in FIG. 4B) has been replaced by a=0X3F498006 and b=0X2AE57620 (see 620 and 625 in FIG. 6B). Using the formula "a+b" for example, the proper CASE value is determined. Also note that the value a=0X3F498006 (see 620), used in the calculation of 0X6A2EF626 (see 630), is another watermark value.

The formula "a+b" may be the addition of two positive numbers or the addition of a positive number with a negative number. The use of addition as the selected formula in 615 is only one of many potential formulas that can be used in this process. The formula could also include and not be limited to a bit-wise shift, multiplication, division, left shift, right shift and others.

In one embodiment variables "a" and "b", are calculated by calculating a random number for "a" then that number is subtracted from the watermark value to obtain the "b". In each case block there would be an assignment for "a" and an assignment for "b" being already incorporated into the program, in another embodiment "b" is zero, in yet another embodiment "a" must be calculated.

Following the program of FIGS. 6A and 6B, the case statement has a SWITCH statement that operates on a CASE variable being formula a+b. Based on the formula a+b, the "a" 605 and "b" 610 are added together to produce 25778F89. This dynamic watermark of 25778F89 is matched against each CASE value in the CASE statement, in order, until a match is found. The 25778F89 does not execute the first CASE block, goto L__65_new, as the watermark of 25778F89 does not match or equal the first CASE value, case 1, the watermark of 25778F89 is then evaluated or compared against the next case value of the CASE label, case 0X255778F89. Here, the dynamic watermark of 25778F89 does equal the static watermark value in the CASE label and thus the CASE block of goto L__13952 is executed. Once in the CASE block, the new "a" and "b" would be obtained.

Looking at another case value in the CASE statement, if the dynamic watermark was calculated to be 252A7B 1F and the matching static watermark is found, the CASE block associated with the static watermark would be calculated. Here, the CASE block is goto L__97_new. FIG. 6B shows that the L__97_new CASE block defines "a", see 620, and the "b", see 625. These values would be taken to the goto L__13949 program which is shown before the SWITCH statement on FIG. 6A. According to the CASE variable "a" 620 must be added to "b" 625 to produce a value that is then compared to each case value in the CASE statement. Once there is a match or equality between the dynamic and static watermarks, the execution goes into the CASE block associated with the static watermark and the cycle continues. The CASE variables are obtained at the last minute from the CASE block, thus the calculations occur at the SWITCH statement to determine the next CASE value. If the proper CASE variable is not calculated then the program crashes. In this instance, if a hacker notices the watermark is, for example "b" being the "11111111" number and removes that variable the program will crash as the dynamic watermark is calculated from the "a" and "b" assignments in the CASE block.

The use of a watermark value in the formula itself reduces the number of times each part of the watermark appears in the binary file, improving stealthiness and reducing the likelihood that the program will be tampered with. Also, since a formula is used in this embodiment, rather than assignment, multiple watermark values can be used in each CASE branch, one as the expected result and one or more as inputs to the evaluation. This approach further increases tamper resistance since multiple values must be removed simultaneously to remove the watermark which makes it difficult for a tampering party to preserve logic flow.

A further extension to the use of a formula to calculate a watermark value is to use an externally provided value, such as a password, biometric data, internet data or dongle for insertion into the formula. In such as case, the value of "a" can be provided during software development by the watermarking party and the value of "b" can be provided to the authorized user or purchaser of the protected software. At the time that the software is executed, the user may be prompted to enter the authentication data for variable b. If this value is not correctly input at run-time of the software or is not provided, the software program will stop execution. This will deter any unauthorized use of the program. Unlike conventional password protection, the present watermark is embedded into the software executable file making it difficult to remove or bypass.

An example of the externally provided value would be where an authorized user would have legally obtained a program having an "a" value within the program. The "b" value is completely outside the program and may be provided to the authorized user on a dongle, such as a USB device, so to use the program the USB device must also be used in order for the "a" and "b" value to produce a value. If the authorized user sends a copy of the authorized copy to another person via email or other means, the recipient cannot run the program as the user did not receive the USB device having the "b" value. Only the authorized user with the physical device, the USB device, will be able to run the program. However, the unauthorized user could run the program if the USB device having the "b" value was mailed to that unauthorized person.

The watermark values generated in accordance with the present invention are preferably implemented in a manner that generally survives the compilation process. One method to accomplish this objective is to embed the watermark values in sections of the source code that a compiler is not likely to eliminate or significantly modify during optimization. A normal GOTO statement using labels employs tokens that the compiler has the option of replacing. The present invention may perform a calculation that the compiler does not believe it has the option to replace. From the compiler's perspective, the calculation of the control-flow label is a necessary functionality rather than a sequential number. The compiler cannot distinguish the calculation from other program elements, and therefore does not remove it.

The present invention is not to be limited in scope by the specific embodiments described herein. Indeed, various modifications of the invention in addition to those described herein will become apparent to those skilled in the art from the foregoing description and accompanying Figures. Such modifications are intended to fall within the scope of the appended claims. Various references are cited herein, the disclosure of which are incorporated by reference in their entireties.

We claim:

1. A method of software control flow watermarking comprising the steps of:
   obtaining a program for protection, the program embodied on a non-transitory computer readable medium;
   generating at least one watermark value;
   generating a protected program wherein generating said protected program comprises the steps of:
     placing the at least one watermark value in at least one CASE statement in execution flow control logic of said program for protection, wherein said CASE statement is not opaque in said control logic and said watermark is visible in said CASE statement rendering the at least one watermark value a visible functional watermark value; and
     inserting a formula into a control flow decision of the program for protection, said formula having a first formula input variable, said formula capable of producing a duplicate of said visible functional watermark value, said first formula input variable being different from said visible functional watermark value, wherein the formula is in A+B form and is placed in said program for protection, wherein the formula has a first formula input variable and a second formula input variable that are each different from the visible functional watermark value, said first formula input variable and said second formula input variable are each inserted into the program for protection, said first formula input variable comprises insertion of an assignment of A to the formula, and said second formula input value comprises inserting an assignment of B to the formula; and
     writing the protected program to a non-transitory computer readable medium,
     wherein the protected program fails to execute properly if said duplicate of said watermark is not attained,
     wherein removal of the visible functional watermark value placed in the at least one CASE statement perturbs execution of the protected program.

2. The method of claim 1, wherein removal of the visible functional watermark value placed in the at least one CASE statement perturbs execution of the protected program.

3. The method of claim 1, wherein said formula is a bitwise shift.

4. The method of claim 1, further comprising:
   generating a second formula input value different from the visible functional watermark value; and
   inserting the second formula input value into the program for protection, said second formula input value comprises inserting an assignment of B to the second formula input value, wherein the formula includes at least one variable from outside of the program and wherein the protected program fails to execute properly if the at least one variable from outside of the protected program is incorrect.

5. The method of claim 4, wherein the formula is in A+B form, wherein the first formula input value inserted into the program comprises inserting an assignment of A to the first formula input value.

6. The method of claim 1, wherein the control flow decision of the program comprises a SWITCH statement.

7. The method of claim 1, wherein the execution flow control logic of the program comprises a CASE VALUE.

8. The method of claim 1, wherein the program comprises source code.

9. The method of claim 1, wherein the formula includes at least one variable from outside of the program.

10. The method of claim 9, wherein the protected program fails to execute properly if the at least one variable from outside of the program is incorrect.

11. The method of claim 1, wherein the protected program fails to execute properly if said duplicate of said watermark is not attained.

12. A non-transitory computer-readable medium encoded with computer executable instructions for a software control flow watermarking system executable on a processor comprising:
    a program for protection;
    software code for generating at least one watermark value using one of a formula or process;
    software code that places the at least one watermark value in at least one CASE statement of the program for protection thereby creating a protected program, wherein said CASE statement is not opaque in said control logic and said watermark is visible in said CASE statement rendering the at least one watermark value a visible functional watermark value;
    formula inserting software code that places a formula into the control flow decision of the program for protection, said formula capable of producing a duplicate of said visible functional watermark value,
    wherein the formula is in A+B form and is placed in said program for protection,
    wherein the formula has a first formula input variable and a second formula input variable that are each different from the visible functional watermark value, said first formula input variable and said second formula input variable are each inserted into the program for protection, said first formula input variable comprises insertion of an assignment of A to the formula, and said second formula input value comprises inserting an assignment of B to the formula,
    wherein the protected program fails to execute properly if said duplicate of said watermark is not attained, and
    wherein removal of the visible functional watermark value placed in the at least one CASE statement perturbs execution of the protected program.

13. The system of claim 12, further comprising software code which determines at least a portion of the visible functional watermark value by an internal formula with at least one variable.

14. The system of claim 13, wherein the formula includes at least one variable from outside of the protected program.

15. The system of claim 14, wherein software code fails to execute properly if the at least one variable from outside of the protected program is incorrect.

16. The system of claim 12, wherein said first formula input value and said second formula input value are each generated wherein the formula includes at least one variable from outside of the program and wherein the protected program fails to execute properly if the at least one variable from outside of the protected program is incorrect.

17. A program embodied on a non-transitory computer readable medium and executable on a processor, the program comprising;
    code, said code obtaining a program for protection, the code being embodied on a first computer readable medium;
    a formula to calculate at least one watermark generated by said code, said at least one watermark value being placed in at least one CASE statement in an execution flow control logic of said program for protection generating a protected program, wherein the formula is in A+B form and is placed in a control flow decision of said program for protection, wherein said CASE statement is not opaque in said control logic and said watermark is visible in said CASE statement rendering the at least one watermark value a visible functional watermark value; and writing the protected program to a second computer readable medium, wherein said formula capable of producing a duplicate of said visible functional watermark value, wherein the formula has a first formula input variable and a second formula input variable that are each different from the visible functional watermark value, said first formula input variable and said second formula input variable are each inserted into the program for protection, said first formula input variable comprises insertion of an assignment of A to the formula, and said second formula input value comprises inserting an assignment of B to the formula, wherein the protected program fails to execute properly if said duplicate of said watermark is not attained, and wherein removal of the visible functional watermark value placed in the at least one CASE statement perturbs execution of the protected program.

18. The program of claim 17, wherein said formula is placed in said program for protection and wherein said formula includes at least one variable from outside of the protected program.

19. The program of claim 18, wherein the protected program fails to execute properly if the at least one variable from outside of the protected program is incorrect.

20. The program of claim 17, wherein a first formula input value and a second formula input value are each generated and different from the visible functional watermark value, said first formula input value and said second formula input value are each inserted into the program for protection, said first formula input value comprises insertion of an assignment of A to the first formula input value, and said second formula input value comprises inserting an assignment of B to the second formula input value, wherein the formula includes at least one variable from outside of the program and wherein the protected program fails to execute properly if the at least one variable from outside of the protected program is incorrect.

* * * * *